United States Patent
Diggins (10) Patent No.: US 8,094,967 B2
(45) Date of Patent: Jan. 10, 2012

(54) IMAGE ANALYSIS (75) Inventor: Jonathan Diggins, Hampshire (GB)

(73) Assignee: Snell & Wilcox Limited, Havant, Hampshire (GB)

(*) Notice: Subject to any disclaimer, the term of this patent is extended or adjusted under 35 U.S.C. 154(b) by 707 days.

(21) Appl. No.: 12/297,760

(22) PCT Filed: Apr. 20, 2007

(86) PCT No.: PCT/GB2007/001460
§ 371 (c)(1),
(2), (4) Date: Oct. 20, 2008

(87) PCT Pub. No.: WO2007/125286
PCT Pub. Date: Nov. 8, 2007

(65) Prior Publication Data
US 2009/0103812 A1 Apr. 23, 2009

(30) Foreign Application Priority Data
Apr. 21, 2006 (GB) .................................. 0607918.0

(51) Int. Cl.
G06K 9/40 (2006.01)
(52) U.S. Cl. .................... 382/275; 382/232; 375/240.26
(58) Field of Classification Search ................... 382/275
See application file for complete search history.

(56) References Cited

U.S. PATENT DOCUMENTS

| 5,477,465 | A | * | 12/1995 | Zheng | 702/76 |
| 5,519,774 | A | * | 5/1996 | Battista et al. | 379/386 |
| 2004/0042679 | A1 | * | 3/2004 | Yamada | 382/260 |
| 2004/0091166 | A1 | * | 5/2004 | Yamada | 382/260 |
| 2005/0265623 | A1 | * | 12/2005 | Estevez et al. | 382/268 |
| 2007/0242833 | A1 | * | 10/2007 | Herre et al. | 381/61 |
| 2009/0103812 | A1 | * | 4/2009 | Diggins | 382/191 |

OTHER PUBLICATIONS

Zhao, M., et al., "Content Adaptive Image De-blocking", Consumer Electronics, 2004 IEEE International Symposium on Reading, UK Sep. 1-3, 2004, Piscataway, NJ, USA, IEEE, Sep. 1, 2004, pp. 299-304.
Chowdhury M.U., et al., "Block Identification for Reducing Blocking Artefact in MPEG-1 Video Coded Images using Statistical Inference and Performance Measurement using Block Impairment Metric (BIM)", Proceedings of the ISCA 17th International Conference on Computer Applications in Industry and Engineering ISCA Cary, NC, USA, 2004, pp. 143-147.
International Preliminary Report on Patentability for PCT/GB2007/001460, Issued Nov. 11, 2008.

* cited by examiner

Primary Examiner — Sath V Perungavoor
(74) Attorney, Agent, or Firm — Michael Best & Friedrich LLP (57) ABSTRACT This invention concerns image analysis of video signals or data in order to detect prior, block-based processing, and to quantify block-related picture impairments. Adjacent samples of video data are high pass-filtered, rectified and auto-correlated to form an auto-correlation function. The auto-correlation function may be analysed to provide information regarding block size and other block artefact measures.

36 Claims, 6 Drawing Sheets

IMAGE ANALYSIS

This invention concerns image analysis of video signals or data in order to detect prior, block-based processing, and to quantify block-related picture impairments.

It is very common for video or image processing techniques to make use of "block-based" processing in which the image is divided into equal sized regions and the pixels within each region are processed together. A good example is the video compression method in which a transform is applied separately to each of a regularly structured set of blocks of pixels and each block is represented (for transmission or storage) by a set of transform coefficients. When different processing is applied to the different blocks, for example different quantisation of transform coefficients, the block structure can become visible as an image artefact because the spatial frequency response of the transmission system varies from block to block.

In broadcasting and multimedia content creation and distribution it is frequently desirable to check the subjective quality of video and image data, and in particular, automatic methods of assessing subjective quality are increasingly being sought for economic reasons. Video quality analysis methods fall into two types: "double-ended" methods where the processed images are compared with unprocessed images to identify artefacts; and, "single-ended" methods in which the processed images are analysed without reference to unprocessed images. Double-ended methods are usually only applicable to a research and development environment; single-ended methods are preferable in normal commercial production and distribution operations.

There are a number of known methods for automatically analysing subjective "blockiness" or block artefacts. In this context, "blockiness" or block artefacts are a measure of the subjective impairment of the images due to the block-based processing.

Generally these methods require prior knowledge of the positions of the block boundaries or the size of the blocks. For example: if the boundary positions are known, average luminance or chrominance differences can be evaluated across the boundaries; and, if the size of the blocks is known, inter-pixel differences can be evaluated in a repeating pattern with a periodicity equal to the block size.

The need for prior knowledge of the block structure severely limits the usefulness of these methods. It is not unusual for images to undergo spatial transformations, such as aspect ratio-conversion in which the block size in changed; these processes may be cascaded and block-based compression or processing may be applied at any point in the signal chain. An image may therefore have been subjected to a number of different block-based processes with arbitrary block sizes and boundary positions; and, there may be more than one set of block-based artefacts present with different block structures for the different sets of artefacts.

The invention comprises a novel method of image analysis in which block-based artefacts can be quantified, and the size of processing blocks measured, without having prior access to the unprocessed image.

The invention consists, in one aspect, method of analysing image data to quantify artefacts due to block-based processing in which a set of pixel values derived from said image data is spatially filtered and rectified and one or more impairment parameters are derived from the said filtered and rectified values.

Advantageously said filter is a high-pass filter which may be set to pass only frequencies which are likely to contain block edge information. Preferably, said filter is a band-pass filter to exclude higher frequencies which may represent noise, in the context of block based processing.

In an important example, said filter is selected automatically from two or more alternative filters the selection depending on a comparison between respective rectified filter outputs.

Suitably, an inverse coring function is applied to the rectified data.

A block size parameter may be derived from analysis of the spatial frequency spectrum of the filtered and rectified data. A block size parameter may be derived from analysis of a two dimensional autocorrelation function of the filtered and rectified data.

A block-artefact presence parameter may be derived, in one example by the steps of:

evaluating the energy within a band of spatial frequencies including the spatial frequencies of expected block sizes;

evaluating the energy outside the said band of spatial frequencies including the spatial frequencies of expected block sizes; and, flagging the presence of block artefacts when the energy within the band of spatial frequencies including the spatial frequencies of expected block sizes exceeds the energy outside the said band of spatial frequencies including the spatial frequencies by a threshold value.

Advantageously, said filtered and rectified data is summed vertically or horizontally over substantially the full image height or width prior to the said impairment parameter derivation. An impairment parameter may be derived from an autocorrelation function of the said summed data. A block size parameter may be derived from the distance between peaks in the said autocorrelation function or from a discrete cosine transform of the said autocorrelation function. One or more basis functions of the said discrete cosine transform may be chosen to correspond to expected block spatial frequencies. The autocorrelation function may be filtered by a spatial band-pass filter. The autocorrelation function may be filtered by a temporal low-pass filter which combines data from two or more images in a sequence of images.

Block size parameters from more than one image may be combined; the combination may be a modal value.

Block edge positions may be identified by the steps of:

adding together pairs of summed filtered and rectified pixel values spatially separated by a measured block size to obtain a set of addition results;

finding the maximum value of the set of addition results; and, identifying the location of one of the pixels contributing to the maximum value of the set as a block edge location.

An identified block edge location may be modified by the steps of:

evaluating pixel value difference magnitudes between pairs of pixels at least two pixels apart where the evaluation is made at the identified block edge location and at locations on each side of identified block edge location;

testing the said pixel value difference magnitudes to identify a local maximum;

if a local maximum exists: modifying the identified block-edge location to correspond with the location of the local maximum; and if no local maximum exists: discarding the identified block edge location.

In a further aspect the present invention consists in a method of determining a block artefact measure for an image region comprising the steps of:

identifying block edge locations at positions within the said region;

evaluating pixel-value difference magnitudes between pairs of pixels at least two pixels apart at each position where a block-edge location is identified;

summing the said evaluated pixel value difference magnitudes for all the positions within the region at which block edges are identified to give a block-edge difference sum;

evaluating the average pixel-value difference magnitude between adjacent pixels within a block interior region comprising positions before and after positions where block-edge locations is identified but excluding positions close the identified location;

summing the average pixel-value difference magnitudes for all the said block interior regions to give a block interior difference sum; and forming a block artefact measure by dividing the block-edge difference sum by the block interior difference sum.

Preferably, the number of identified block-edge positions within the said region at which block edges are identified is added to the said block interior difference sum before dividing it into the said block-edge difference sum to form the block artefact measure.

Suitably, the block artefact measure is weighted by an average luminance value so that the artefact measure is attenuated in areas of very high and very low average luminance.

A block artefact measure for an image may be formed by combining one or more of the highest respective regional artefact measures and discarding other regional artefact measures. Artefact measures for images in a sequence may be combined in a temporal low-pass filter. The artefact measure may be expressed as a logarithm.

In one example, a block artefact measure is derived from the variation in block artefact measure of an image sequence over a sequence of images. The variation in block artefact measure of an image sequence may be analysed to identify a repeating pattern of picture coding methods.

Still further aspects of the present invention are set forth in the appended claims.

The invention will now be described by way of examples with reference to the drawings, in which.

The invention may used to analyse image data representing values associated with pixels of an image. The values may represent luminance, colour difference (e.g. $C_B$ or $C_R$), primary colour component (e.g. R, G or B) or any other convenient pixel parameter. Analogue video signals may be sampled to obtain pixel values for analysis.

Figure 1:
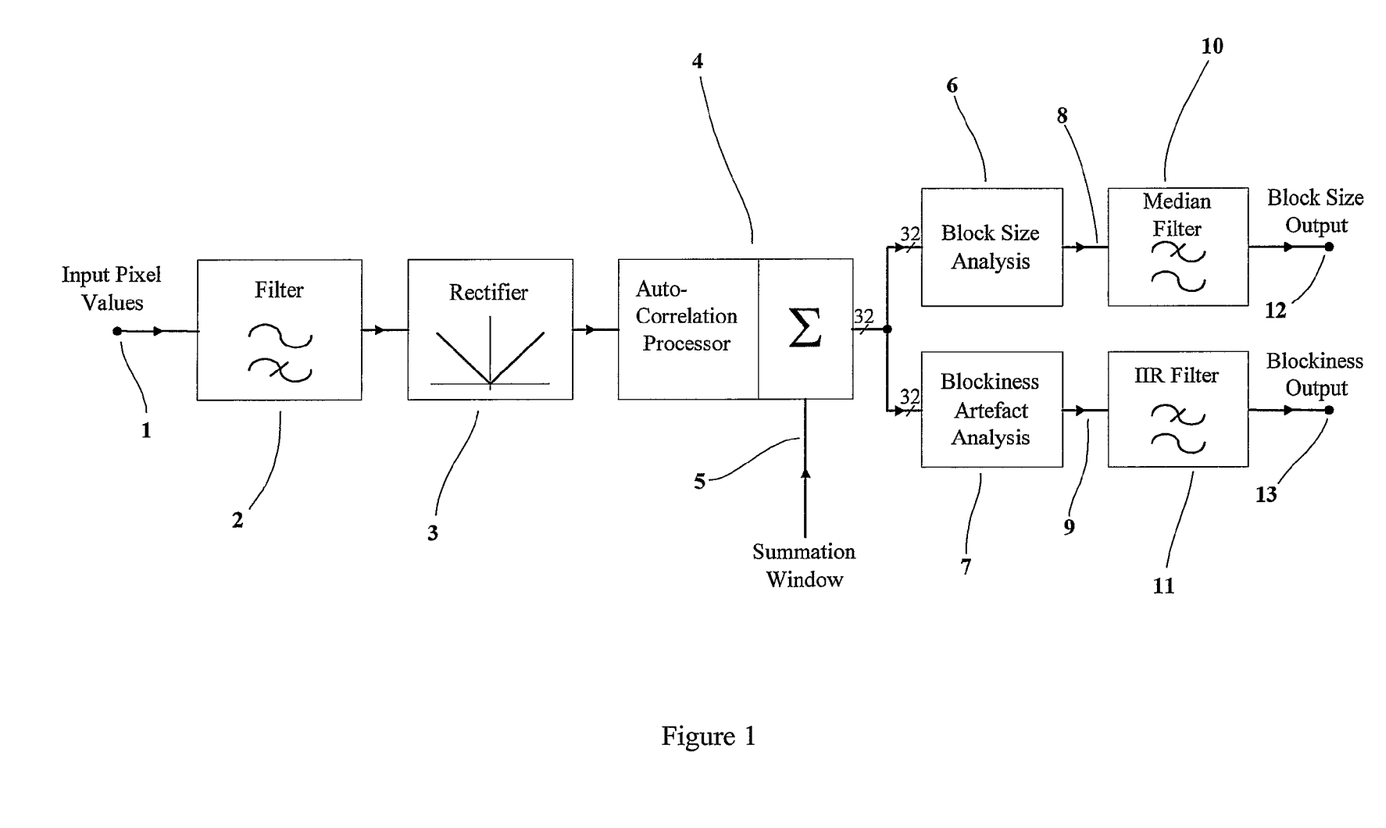
FIG. 1 shows an image data analysis system according to an embodiment of the invention.

Referring to FIG. 1, a sequence of values corresponding to adjacent pixels (1) is input to a high-pass filter (2). If the objective is to analyse the horizontal component of the block structure, a sequence of horizontally adjacent pixels is used, such as the stream of luminance values from alternate words of an ITU-R Rec. 656 digital interface signal, or successive samples of video waveform sampled at a multiple of its line frequency. Alternatively, a stream of values corresponding to vertically adjacent pixels can be input so as to analyse the vertical component of the block structure. If the image was scanned with an interlaced raster vertically adjacent pixels may be from adjacent fields.

In some embodiments, the sequence of pixel values (1) may include non-picture values such as blanking and synchronisation data values. These regions comprise only a minority of the total pixels in an image to be analysed and so it is usually unnecessary for them to be excluded.

As mentioned above, when different processing is applied to the different blocks, for example different quantisation of transform coefficients, the block structure can become visible as an image artefact because the spatial frequency response of the transmission system varies from block to block. This difference in the spatial frequency response between blocks is most marked at high frequencies. Thus the high pass filter (2) in the exemplary embodiment is used to select the high frequency spatial components of the input signal for further analysis.

For the horizontal analysis of standard definition television signals, the high-pass filter (2) may conveniently be implemented in known manner by a Finite Impulse Response (FIR) transversal filter. A suitable filter cut off frequency for luminance signals sampled at 13.5 MHz according to ITU-T Recommendation 601 is 5 MHz.

The filter output is rectified by a rectifier (3), which gives an output equal to the magnitude of its input. The rectified output is fed to a correlation processor (4), which calculates an auto-correlation function of the incoming rectified values according to the following expression:

$$A(d) = \Sigma(R_x \times R_{x-d})$$

Where:

$R_x$ is the current rectified input value;

$R_{x-d}$ is the $d^{th}$ previous rectified input value.

The expression is evaluated for values of d between unity and at least the largest expected block dimension. Where a sequence of horizontally-adjacent pixels from MPEG-2 decoded video is analysed, a convenient range of values of d is one to 32.

Typically, in the case of horizontal analysis, the summation is performed over a complete field of the image. In some embodiments, a larger or smaller set of pixels may be chosen; for example the block structure may vary within the image and it may be helpful to analyse smaller sections to reveal this variation. In FIG. 1 the correlation processor (4) receives a summation window signal (5) which identifies the set of pixels to be included in the summation. As mentioned previously the summation need not necessarily exclude blanking and synchronisation data and so the summation window signal can be a simple once-per-field reset of the summation.

Where vertical analysis of interlaced images is required the summation will include pixels from more than one field and the exact nature of the summation window signal (5) will depend on the way the access to these fields is arranged. One possibility is for the interlaced image to be written to a frame store and read out as a progressively scanned image. In this case the summation can be reset at the frame rate.

The output from the correlation processor (4) is a set of values A(d) for each summation defined by the summation window signal (5). In a typical process analysing streaming video this output will be a set of 32 values once per field. These sets of values are passed to two analysis processes: a block size analyser (6); and, a block artefact analyser (7).

Figure 2:
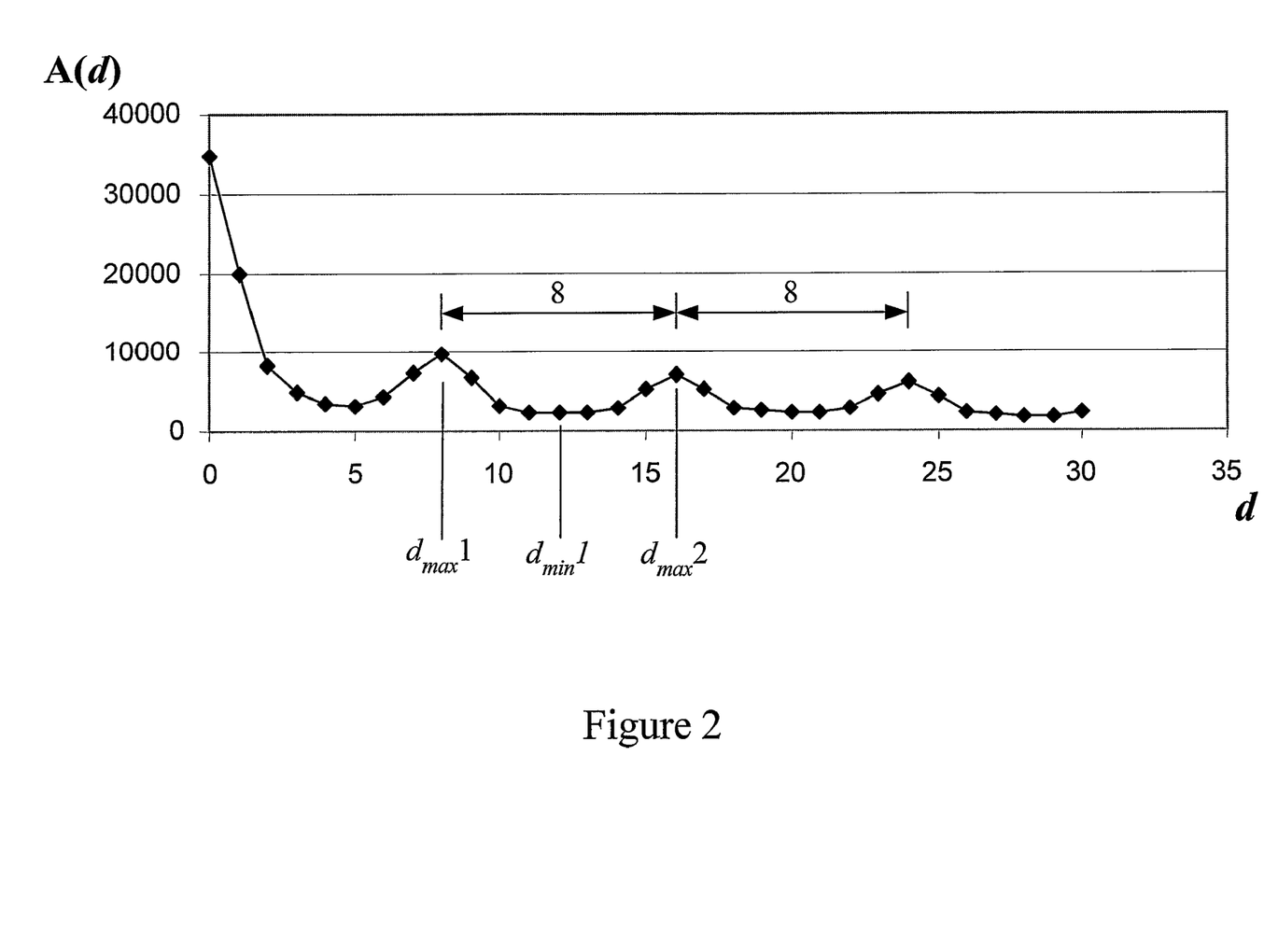
FIG. 2 shows a typical auto-correlation function derived from a block-impaired image.

An example of an output from the correlation processor (4) is shown in FIG. 2. (The Figure shows values of d from zero to 30 for illustration, in a practical system a different range of values of d, such as one to 32, may be used.) The auto-correlation function A(d) shows regular peaks and by analysis of the height and pitch (inter-peak distance) of these peaks the magnitude of block artefacts and the block size can be determined.

The block size analyser (6) determines the pitch in units of d. d is the distance between successive (filtered and rectified) samples input to the correlation processor (4). This pitch may be converted to the block size, depending on the input sample spacing, and is output (8). In the exemplary embodiment of FIG. 2 the input samples are adjacent pixel values and each unit of d represents one pixel. Thus in the example shown in FIG. 2 the block size is eight pixels.

One method of operation of the block size analyser (6) is to determine the distance between the two most pronounced local maxima of the auto-correlation function as follows:

Identify those values of d for which:
 A(d)>A(d−1) and A(d)>A(d+1)
 (These d values correspond to the locations of local maxima.)
For each so-identified value of d, choose:
 The lesser of: |A(d)−A(d−1)| and |A(d)−A(d+1)|
 Associate each chosen value with its corresponding d value.
 (These chosen values give a measure of how pronounced the corresponding local maximum is.)
Find the two highest chosen values.
 (These identify the two most-pronounced local maxima.)
For these two highest chosen values, determine:
 The magnitude of the difference between their associated d values.
 (This is the block size.)

Other methods of measuring the distance between peaks in the function will be apparent to the skilled person.

It should also be noted that the block size may not be an integral number of pixels (the image may have been re-scaled by a non-integer scaling factor after block-based processing). There are known methods of determining the location of peaks in a sampled function to sub-sample accuracy, such as fitting a quadratic or other function to the sampled function. Such methods can be used to determine the block size with sub-pixel resolution.

The block artefact analyser (7) analyses the heights of the peaks in the auto-correlation function relative to the levels of the intervening troughs, and outputs the result as a block measure output (9). A suitable method is as follows:

Identify the d values corresponding to the two most pronounced local maxima (for example by the method described above).
Let these be $d_{max}1$ and $d_{max}2$
Define the d value corresponding to the trough between these local maxima as:

$$d_{min}1 = \text{Rnd}\{\text{Min}[d_{max}1, d_{max}2] + \tfrac{1}{2}|d_{max}1 - d_{max}2|\}$$

Where: Rnd{ } indicates rounding to the nearest integer.
Determine the block artefact parameter:

$$\text{Block artefact} = 10 \log_{10}\{[A(d_{max}1)] \div [A(d_{min}1)]\}$$

Other methods of determining a measure of the ratio heights of the peaks to the heights of the intervening troughs will be apparent to the skilled person.

If the number of pixels in the summation window is small, the block size output (8) and the block artefact measure (9) may be unreliable. Optionally, greater reliability can be achieved by combining the results of several summations; for example the analysis results from several fields of a video sequence may be combined. This is shown in FIG. 1 by including a median filter (10) at the output of the block size analyser (6); and, a recursive (IIR) filter (11) at the output of the block artefact analyser (7).

A suitable algorithm for the median filter (10) is to sort the current filter input and an even number of previous filter inputs, two say, into rank order, and select the middle ranking input as the filter output. This value then forms the block-size output (12) from the analyser.

If the block size is very small the natural correlation of nearby pixels may mask the peaks in the output from the correlation processor (4) and it may be convenient to identify block sizes below a certain size as unreliable, or to inhibit small block size values from being output.

It is also possible that there may be evidence of more than one block structure in the output from the correlation processor (4). This can give rise to more than one regular pattern of peaks. For example a macroblock structure (consisting of, say, eight smaller blocks) may be present. Alternatively there may be more than one unrelated pattern of peaks. In these cases it may be possible to identify more than one block structure by analysis of the relative heights of the peaks.

A suitable algorithm for the IIR filter (11) which combines the block artefact measures from a stream of video fields as follows:

$$\text{Output}_{(n)} = \tfrac{1}{4}[3 \times \text{Output}_{(n-1)} + \text{Input}_{(n)}]$$

Where:
$\text{Output}_{(n)}$ is the current filter output;
$\text{Output}_{(n-1)}$ is the previous filter output; and,
$\text{Input}_{(n)}$ is the current filter input.

There are other block artefact parameters which can be derived from the output of the correlation processor (4):

The ratio $[A(d_{max}1)] \div [A(d_{min}1)]$ could be expressed as a linear quantity rather than as a logarithm;
The peak-to-trough distance could be divided by the sum of all the correlation values:

$$\text{Block artefact measure} = [|A(d_{max}1) - A(d_{min}1)|] \div [\Sigma A(d)]$$

The peak-to-trough distance could be divided by a weighted sum in which less weight is given to A(d) when d is small:

$$\text{Block artefact measure} = [|A(d_{max}1) - A(d_{min}1)|] \div [\Sigma W(d) \cdot A(d)]$$

Where: W(d) is a weighting function.

It may be helpful to weight the block artefact measure according to the picture content so that a higher artefact rating is given in smoothly varying areas of the picture where block artefacts are likely to be more visible. Such areas can be identified by a measure of the signal energy at the output of the filter (2). A suitable energy value is that obtained by squaring the filter outputs for each pixel and accumulating the results (this is A(0)). Alternatively a filter other than the filter (2) can be applied to the input pixel values (1) and the output of that other filter squared and used to calculate an energy value. A weighted block artefact measure can be obtained by multiplying one of the previously described metrics by an energy value.

Similarly, block artefacts are more likely to be visible where there is little motion in the picture. Such areas can be identified by taking inter-field differences between co-located pixels and summing the results. Any of the previously described block artefact measures can be multiplied by this sum to give a weighted block artefact measure.

If MPEG, or similarly coded video, is being analysed, the frame-to-frame variation of a block artefact measure can be used to identify the length of the Group-of-Pictures (GoP) cycle. (i.e. The pattern by which directly-coded and various types of prediction-coded frames follow each other.) A low-frequency variation of the block artefact measure can be identified by a low-pass filter and the period of this frequency can be assumed to be the duration of one GoP.

A further artefact measure can be derived from the frame-to-frame variation of the block artefact measure; this can give an indication of the subjective impairment of a video sequence due to variation of coding artefacts with time.

The invention is not restricted to horizontal or vertical analysis; data from pixels along any straight line in an image can be analysed. In some circumstances (e.g. where the block-size is large relative to the pixel pitch) it may be convenient to spatially sub-sample the pixels prior to processing (with or without associated pre-filtering or interpolation).

The invention may be applied in a two dimensional manner by performing a two-dimensional auto-correlation process in the block (4) of FIG. 1 and analysing the resulting two-dimensional auto-correlation surface for peaks and troughs.

The correlation processor (4) may be simplified by omitting some d values from the summation. For example, d values providing most useful information can be identified by experience in analysing particular types of image data and less-informative d values excluded from the calculation.

Figure 3:
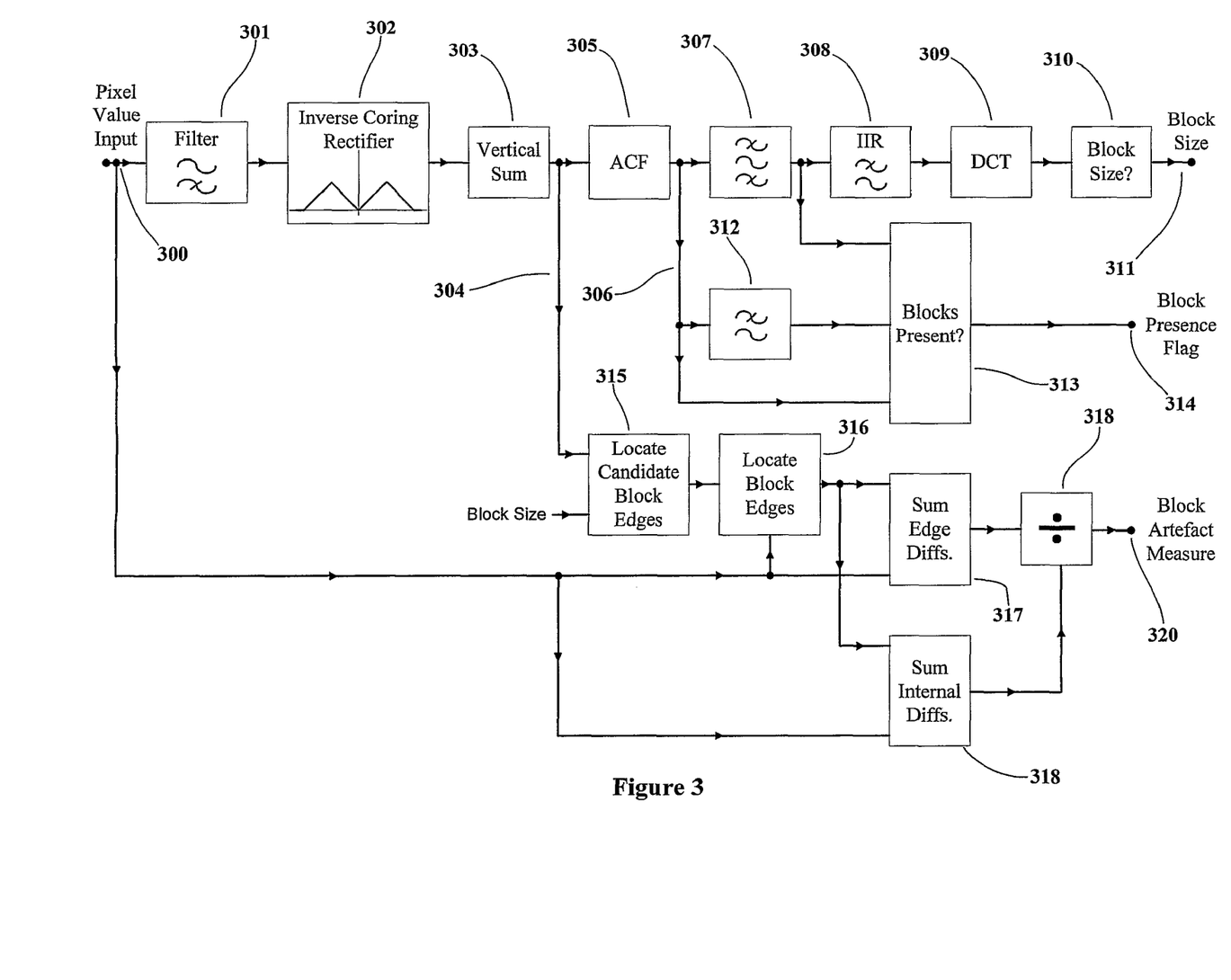
FIG. 3 shows an image data analysis system according to an alternative embodiment of the invention.

A block diagram of a further example of the invention is shown in FIG. 3. An input stream of pixel values (300) is input to a filter (301), which identifies high frequency components. If the images have been up-converted, for example from standard-definition to high-definition, there may not be sufficient high-frequency information at the filter output to analyse. In this case it is preferable to use a filter having a lower frequency pass-band, such as a non-sharp, band-pass filter centred near the mid-band; i.e. about half the Nyquist frequency. Automatic switching between different filters can be arranged by comparing the rectified output of at least one filter with a threshold and choosing the filter having the highest frequency pass-band containing significant output information.

The filtered output is rectified and small-amplitude values selected in a combined rectification and inverse-coring function (302). This function returns the absolute magnitude of low amplitude samples from the filter (301) and progressively attenuates samples whose magnitude exceeds a fixed, low threshold. The resulting set of filtered, inverse-cored and rectified pixel values are summed vertically over each individual image in a summing block (303) to obtain a set of "pixel-column activity" values (304). The set comprises one value for each horizontal pixel location of each image represented by the stream of pixel values (300). By summing vertically-adjacent values for all the lines of the image the amount of data to be handled is considerably reduced and, the set of summed pixel-column activity values (304) will contain sufficient information for the block horizontal size to be determined.

An autocorrelation function processor (305) calculates the autocorrelation function of the set of pixel-column activity values (304) from each image. The function should have sufficient range to exceed the widest expected block width by a factor of three or four times; typically, correlation values for inter-sample spacings from zero to at least 100 are calculated.

The output (306) of the correlation function (305) for each image will be similar to FIG. 2 and will have a periodic variation reflecting the horizontal block structure. If the correlation function shown in FIG. 2 is treated as a segment of a notional sampled signal, where the vertical axis represents amplitude and the horizontal axis represents spatial position, useful information may be obtained by filtering that notional signal; in particular a band-pass filter can separate out the alternating component due to the block structure. This is done by a band-pass filter (307), which passes the band of spatial frequencies including all expected block sizes and removes lower and higher frequency components.

When a sequence of images representing a moving scene is being processed, each image will result in a filtered notional signal segment at the output of the filter (307), and these segments will vary with time as the sequence progresses. These temporal variations are smoothed by a low-pass temporal filter (308) which recursively combines corresponding correlation values from succeeding images in the sequence so as to reject short-duration spurious results and obtain a more representative set of notional signal segments.

These filtered segments are passed to a discrete cosine transform (DCT) processor (309); note that other cosine-based transforms can be used in place of the DCT. This transforms each notional signal segment into the frequency domain so that, for each segment, a set of transform coefficients is derived representing the magnitudes of frequency components of the spectrum of that notional signal segment. Each transform coefficient indicates the magnitude of a respective horizontal block spatial frequency. The basis functions of the transform can be chosen to include expected block sizes, and may include non-integral block sizes; i.e. frequencies which are not integral multiples of the horizontal pixel pitch. Typically about 17 transform coefficients are derived.

The sets of transform coefficients from the DCT processor (309) are evaluated in a block size determination process (310) so as to determine the horizontal block size. If, as will usually be the case, the band-pass filter (307) does not have a flat pass-band, the DCT coefficients will need to be corrected according to a window function which "equalises" the filter pass-band response so that each transform coefficient accurately reflects the amplitude of the relevant block spatial frequency.

The block size determination process (310) operates by ranking the transform coefficients once per image and finding the three largest values. The largest coefficient is likely to correspond to the block size, or a multiple of the block size. If the set of three values contains values which are multiples of each other, the lowest sub-multiple is retained and the higher discarded. Preferably, the determined block sizes for several images in a sequence are combined in a histogram and the most frequently reported block size, i.e. the modal value of the set of detected values, is output (311).

It is helpful to test for the presence of block artefacts and to inhibit block size and block artefact determination if no such artefacts are present. This is done by further processing of the autocorrelation function (306). The function is low-pass filtered (in an analogous way to the band-pass filter (307)) in a low-pass filter (312). The unfiltered autocorrelation function (306) and the outputs from the filters (307) and (312) are processed in a block presence determination function (313) to derive a block presence flag (314).

Figure 4:
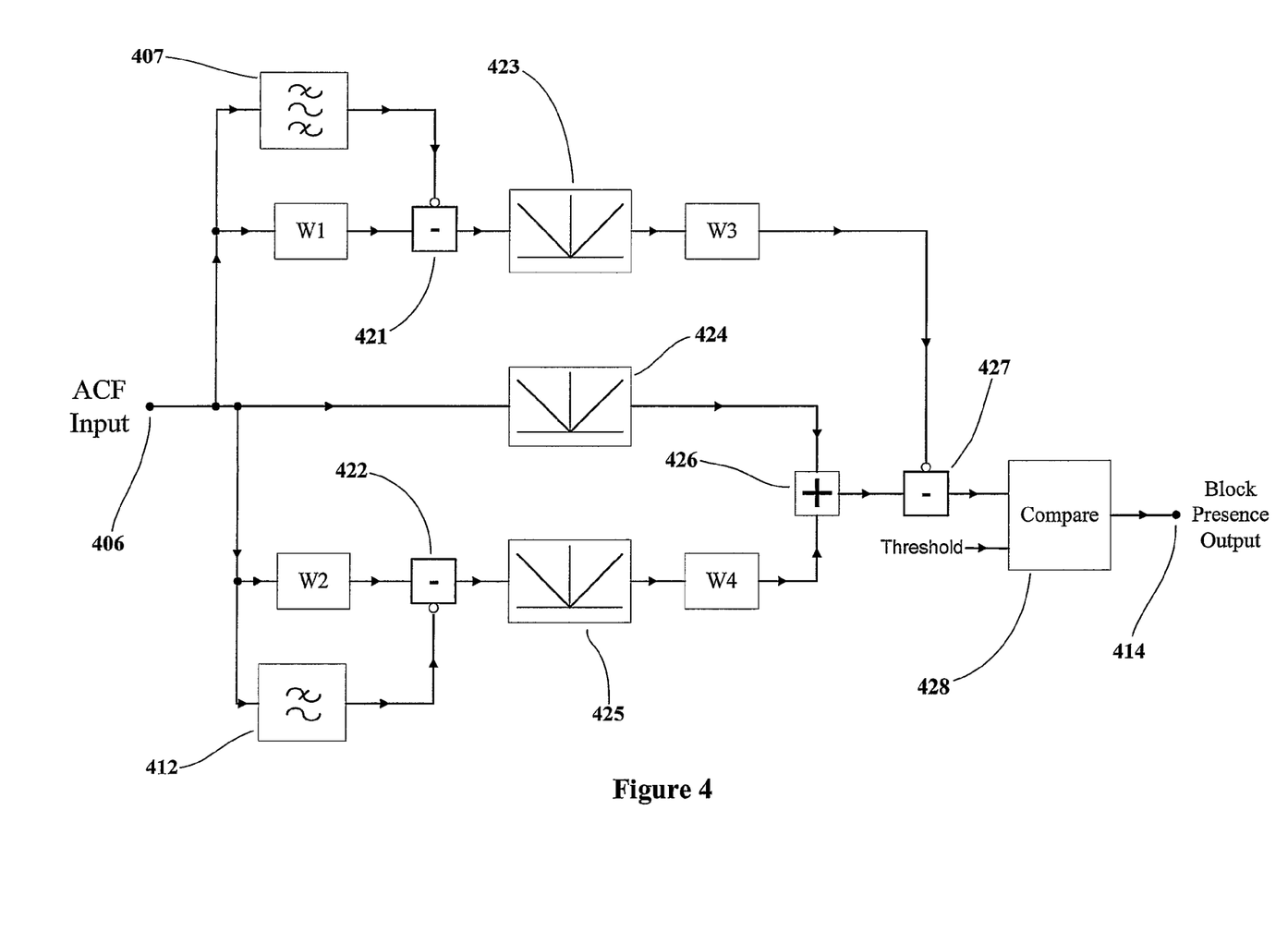
FIG. 4 shows a system for analysing an autocorrelation function to determine the presence of block artefacts.

The block presence function (313) detects the condition where the activity of the autocorrelation function (306) is concentrated in the pass-band of the bandpass filter (307). A suitable method is shown in FIG. 4. In this Figure, an input correlation function (406) is band-pass filtered (407) and low-pass filtered (412). (These filters correspond to the filters (307) and (312) of FIG. 3.) Weighted differences between each of the filter outputs and their respective inputs are formed by subtractors (421) and (422). These are rectified in rectifiers (423) and (425); and the unfiltered correlation function is also rectified in a rectifier (424). A weighed combination of the outputs from the three rectifiers is made by the adder (426) and the subtractor (427). This combination is compared with a threshold in a comparator (428) and a block artefact presence flag (414) (equivalent to the flag (314)) is activated when the combination exceeds the threshold.

Returning to FIG. 3, candidate block-edge positions are found by further processing of the pixel-column activity values (304). This is done in a candidate block-edge location process (315), which analyses the data values (304) to determine positions of peak activity separated by a distance equal to the determined block size.

Figure 5:
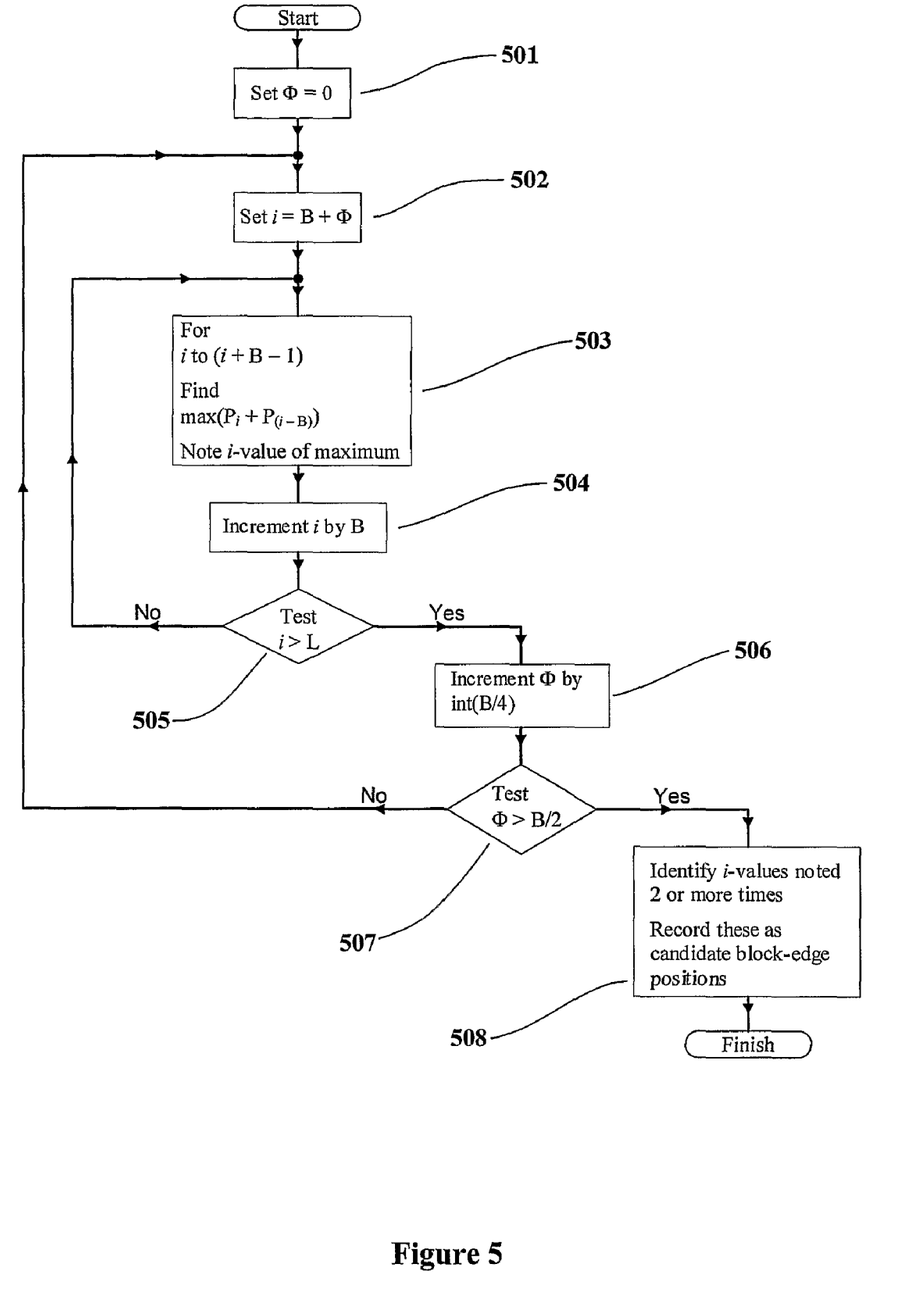
FIG. 5 shows a flow chart of a process for locating candidate block boundary positions.

The candidate block-edge location process (315) receives an input of the measured block size (311). This size value will be the period of one of the basis functions of the DCT (309), and may not be completely accurate; for example, the basis functions may only include integer values and the actual block size may not be an integer number of pixels. Using the measured block size value (311), the set of pixel-column activity values (304) for an image is processed as shown in FIG. 5 to obtain candidate block-edge positions. In FIG. 5 members of the set of pixel-column activity values (304) are denoted by Pi, where i is an index value such that the left-most value has the index zero and the right-most value has the index L (i.e. the images are (L+1) pixels wide). The integer part of the measured block size (311) is denoted by the value B.

If block artefacts are present they will cause peaks to occur in the set of pixel column activity values (304) at the locations of the block boundaries. In the process shown in FIG. 5 the locations of peaks separated by the measured block size are identified.

Referring to FIG. 5, an analysis phase parameter $\Phi$ is set to zero in step (501) and then an index variable i is set to the value (B+$\Phi$) in step (502). In step (503) the activity values of pairs of pixels separated by one measured block-size are summed to obtain a set of B sum-values. The maximum value of this set is identified and the index value of the right-most pixel contributing to it is noted as a first candidate block-edge position.

In step (504) the index parameter is incremented by B and step (503) is repeated for the next B activity values. A second candidate block-edge position is then identified from the maximum of this second set of activity values. The steps (503) and (504) are repeated until the right-most pixel column activity value has been included in a sum. This condition is recognised in a test step (505) and the phase parameter $\Phi$ is incremented by the integer part of one quarter of the measured block size in the step (506). The summing step (503) is then repeated with the starting index increased by the phase increment. This means that further pixel pair sum maxima are selected from blocks of values shifted rightwards. The locations of the maxima are recorded as before. The phase parameter $\Phi$ is then incremented again and a further set of possible block-edge positions is identified and the phase parameter $\Phi$ is incremented again in step (506).

The new phase is tested in step (507) to see if it exceeds one half of the measured block size. If this is so, further searches for maxima are not required and the processing moves to step (508) in which index values which have been identified as the location of maxima at two or more analysis phases are confirmed as candidate block-edge positions, and others are discarded.

This candidate block-edge location process can be improved by bandpass filtering the pixel-column activity values (304) prior to the location process (315). A filter similar to the filter (307) can be used. Without filtering, block-edges can appear as two closely-spaced peaks in the set of pixel-column activity values (304); this is due to the rectification function of the inverse coring rectifier (302) where a single transient at the output of the filter (301) produces two closely-spaced positive and negative peaks. Filtering combines the two peaks into a single broad peak preceded and succeeded by negative overshoots.

The candidate block-edge values from the process (315) are passed to a block-edge location process (316). This process makes use of the actual pixel values (300) and so block edges which extend over less than the full image height can be identified. The process identifies positions close to candidate positions where the difference in value between pixels separated by two pixel pitches is maximum.

Figure 6:
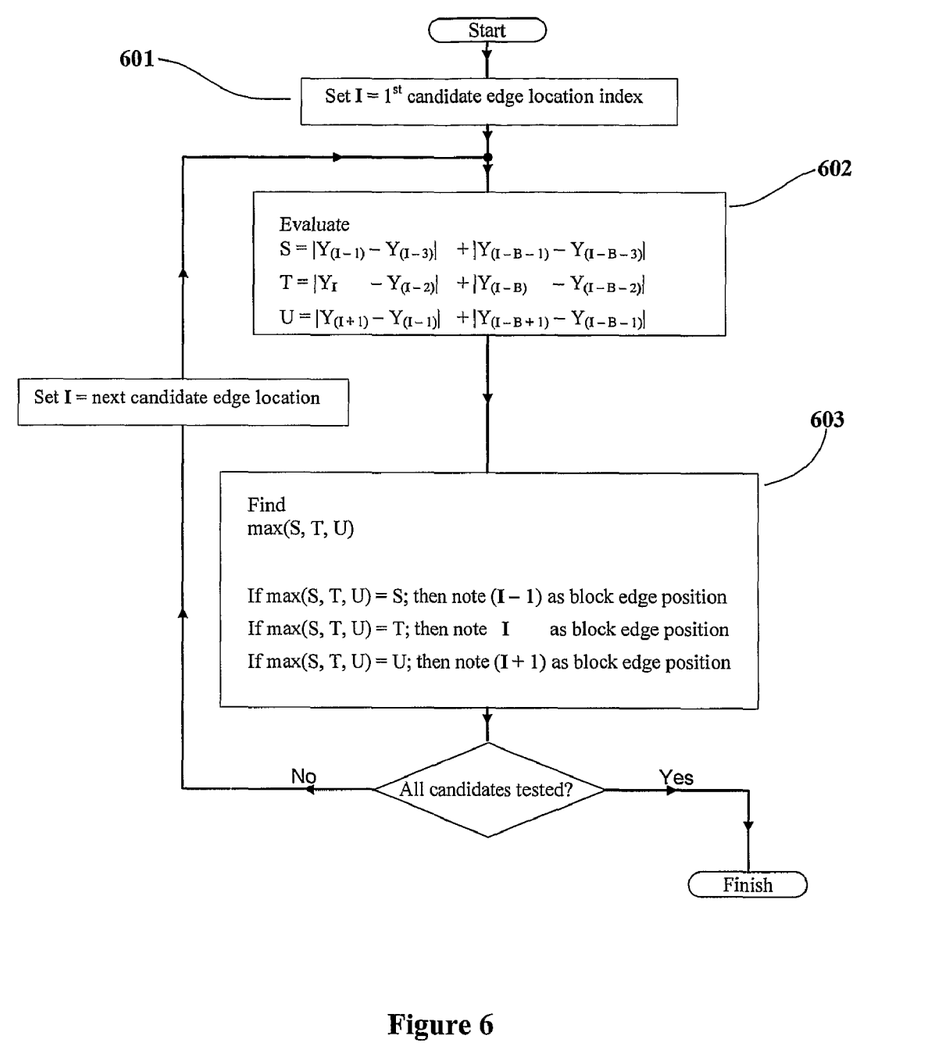
FIG. 6 shows a flow chart of a process for selecting block boundary positions from a set of candidate positions.

A suitable process is shown in FIG. 6. In this Figure pixel values are denoted by YI where I is an index parameter representing horizontal position in units of one horizontal pixel pitch. At step (601) I is set to the index of the first candidate position. At step (602) an evaluation is made, at the position defined by I, of the difference across two pixel pitches, summed for positions one measured block size apart. As shown in the Figure, an equivalent sum value is also calculated for positions one pixel pitch each side of the position defined by I. In step (603) the largest of the three pixel value difference sums is found and the index I corresponding to this largest value is identified as a block-edge position. The steps (602) and (603) are then repeated for the remaining candidate edge positions identified in the process of FIG. 5 to obtain a final set of block-edge positions.

The process shown in FIG. 6 is repeated for each image line. If the block structure is due to MPEG or similar compression the block edge positions will the same on succeeding lines; however, the invention is capable of detecting block edges that are not vertically aligned, such as those from a compressed digital tape machine in high-speed "shuttle" mode.

Variations of the process shown in FIG. 6 are possible. For example the summation of two-pixel-pitch differences separated by one block size can be weighted towards the candidate position, so that the sum T becomes:

$$T = W \times |YI - Y(I-2)| + |Y(I-B) - Y(I-B-2)|$$

Where W is a weighting factor.

The sums S and U shown in the figure should be weighted in the same way. A suitable value for W is 3.

It can also be beneficial to evaluate weighted summations of two-pixel-pitch differences separated by one block size at other positions, more than one pixel pitch away from the candidate position; and to test that the selected block-edge location corresponds to a true local maximum. If the selected location is not confirmed as a local maximum, no edge position derived from the relevant candidate position is recorded.

If the image has been up-sampled after block-based processing it may be helpful for the block-edge location process (316) to use pixel value differences evaluated over a pitch greater than two pixels.

Returning to FIG. 3, the derivation of a block-artefact measure will now be described. Because block edge positions have been found for every line, the artefact measure can be evaluated over any desired image region (including the whole image). As will be explained below, it will usually be helpful to combine results from corresponding regions of successive images in a sequence of images so as to obtain representative results.

Using the detected block-edge positions, the magnitudes of pixel value differences between the detected edge positions and the corresponding positions two pixels to the left are summed in a block edge-difference computation (317).

The sum is: $\Sigma |YE - Y(E-2)|$

Where: YE is the pixel value at detected block-edge positions; and,

The summation is performed over all detected edge positions.

The adjacent-pixel value differences for each block-interior region, excluding the differences close to the block edges, are averaged for each detected block in a block internal-difference computation (318).

The sum is: $\{\Sigma|Yi-Y(i-1)|\} \div (N)$

Where: N is the number of differences in the summation; and, the summation is performed for i values in the ranges:
(E+3) to (E'−3)
Where: E' is the detected edge position after E
For all detected edge positions E.

If the detected block size is smaller than 6 the exclusion of values near to the detected edge position will result in all internal differences being excluded and so fewer values should be excluded in this case.

A block-artefact measure (320) for a region of an image is obtained by dividing the edge-difference sum from the edge-difference computation (317) by the internal difference sum from the internal difference sum (318) in the divider (318). Usually a region will be narrower than the full image width and less tall than the full image height. All the edge position detections that fall within the relevant region are included in the summations, so that a single edge which extends over several lines of the region will contribute to the summations on every image line included in the relevant region.

If the internal difference sum computation (308) produces small values, the division (318) can produce widely varying values for the block artefact measure (320). This effect can be reduced by adding a small value to the internal difference sum from the computation (318) and using this, slightly increased, value in the division (318). A suitable value to add is the number of block edge detections within the relevant region; as for the summations, this will include multiple detections of the same edge on adjacent lines of the same region.

The block-artefact measure can be improved by weighting it according to the mean luminance of the relevant region, so that where the average luminance is very high or very low the artefact measure is attenuated. For example in a system where black is represented by the value 16 and white by 235, average luminance values less than 50 or greater than 170 would result in attenuation of the artefact measure. This weighting gives a result which better correlates with subjective block-artefact estimates.

A useful measure for a sequence of images is to sum the three highest, weighted regional block artefact measures for each image of the sequence and then to take a moving average (or other temporal low pass filter) of the result over several images of the sequence.

There are a number of other variations which can be made to the system of FIG. 3. The processing of the autocorrelation result (306) to derive the block size output (311) could be achieved by taking the Fourier transform of the autocorrelation result (306), and finding the largest Fourier components in the range of spatial frequencies corresponding to expected block sizes. The block presence flag (314) could also be found from the magnitudes of the Fourier components by comparing the magnitudes of the components corresponding to expected block sizes with the magnitudes of other components, whose frequencies are unlikely to be due to block artefacts. This approach is more computationally intensive than the system of FIG. 3, though if suitable resources are available it could be preferable. It is also possible to take the Fourier transform of the vertically summed pixel-column activity values (304) and to obtain a power spectrum from the resulting Fourier components by squaring them. Frequencies corresponding to power maxima are likely to correspond to block spatial frequencies. The phase of the Fourier components will also contain information about the locations of the block edges.

Where a sequence of images is processed it may advantageous to detect "shot-changes" where succeeding images in the sequence are unrelated to each other. The IIR filter (308), and the block edge difference internal difference summations (317) and (318) can be reset at shot changes to avoid combining data from unrelated images. This is only necessary if there is the possibility that the block structure of succeeding images is unrelated.

It is also possible to apply the techniques described so as to detect vertical positions of block-edges by correlating vertically adjacent pixels. The skilled person will be able to adapt the system of FIG. 3 to this case, for example by replacing the vertical summation (303) by an equivalent horizontal summation and making other analogous changes.

A range of features and process steps have been described in a variety of combinations, configurations and orders. It should be understood that those features and process steps may in various applications be deployed with advantage in other combinations, configurations and orders.

The invention may be used to analyse data corresponding to still or moving images, and the data may be derived from computer files or other storage media. The time to analyse an image, or part of an image, may be faster or slower than the length of time for which that image is intended to be presented to a viewer.

The invention claimed is:

1. A method of analysing image data to quantify a block-artefact presence parameter due to block-based processing, the method comprising:
   deriving a set of pixel values from said image data;
   spatially filtering the pixel values;
   evaluating energy within a band of spatial frequencies including spatial frequencies of expected block sizes;
   evaluating energy outside the band of spatial frequencies including the spatial frequencies of expected block sizes; and,
   flagging the presence of block artefacts when the energy within the band of spatial frequencies including the spatial frequencies of expected block sizes exceeds the energy outside the band of spatial frequencies including the spatial frequencies of expected block sizes by a threshold value.

2. The method according to claim 1 in which spatially filtering the pixel values includes filtering with a high-pass filter.

3. The method according to claim 1 in which spatially filtering the pixel values includes filtering with a band-pass filter.

4. The method according to claim 1 further comprising automatically selecting a filter for spatially filtering the pixel values from two or more alternative filters, the selection depending on a comparison between respective rectified filter outputs.

5. The method according to claim 1 further comprising
   rectifying the spatially filtered pixel values; and
   applying an inverse coring function to the rectified data.

6. The method according to claim 1 further comprising
   rectifying the spatially filtered pixel values; and
   deriving a block size parameter from an analysis of a spatial frequency spectrum of the filtered and rectified data.

7. The method according to claim 6 in which block size parameters from more than one image are combined.

8. The method according to claim 7 in which the combination is a modal value.

9. The method according to claim 1 further comprising deriving a block size parameter from an analysis of a two dimensional autocorrelation function of the filtered and rectified data.

10. The method according to claim 1 further comprising rectifying the spatially filtered pixel values and summing the filtered and rectified data vertically over substantially a full image height.

11. The method according to claim 10 further comprising:
adding together pairs of summed filtered and rectified pixel values spatially separated by a measured block size to obtain a set of addition results;
finding the maximum value of the set of addition results; and,
identifying the location of one of the pixels contributing to the maximum value of the set as a block edge location.

12. The method according to claim 11 in which an identified block edge location is modified by:
evaluating pixel value difference magnitudes between pairs of pixels at least two pixels apart where the evaluation is made at the identified block edge location and at locations on each side of identified block edge location;
testing the pixel value difference magnitudes to identify a local maximum;
if a local maximum exists: modifying the identified block-edge location to correspond with the location of the local maximum; and
if no local maximum exists, discarding the identified block edge location.

13. The method according to claim 1 further comprising rectifying the spatially filtered pixel values and summing the filtered and rectified data horizontally over substantially a full image width.

14. The method according to claim 10 in which an impairment parameter is derived from an autocorrelation function of the summed data.

15. The method according to claim 14 in which at least one block size parameter is derived from a distance between peaks in the autocorrelation function.

16. The method according to claim 14 in which a block size parameter is derived from a discrete cosine transform of the autocorrelation function.

17. The method according to claim 16 in which one or more basis functions of the discrete cosine transform are chosen to correspond to expected block spatial frequencies.

18. The method according to claim 14 in which the autocorrelation function is filtered by a spatial band-pass filter.

19. The method according to claim 14 in which the autocorrelation function is filtered by a temporal low-pass filter which combines data from two or more images in a sequence of images.

20. An apparatus for analysing image data to quantify artefacts due to block-based processing, the apparatus comprising:
a spatial filter which operates on a set of pixel values derived from said image data to remove low spatial frequencies; and
a processor configured to derive one or more impairment parameters from the magnitudes of said filtered values.
wherein the apparatus is further configured to compare energy within a band of spatial frequencies including the spatial frequencies of expected block sizes with energy outside the said band of spatial frequencies including the spatial frequencies of expected block sizes; and flag the presence of block artefacts when the energy within the band of spatial frequencies including the spatial frequencies of expected block sizes exceeds the energy outside the band of spatial frequencies including the spatial frequencies of expected block sizes by a threshold value.

21. The apparatus according to claim 20, further comprising a rectifier operating on the spatial filter output.

22. The apparatus according to claim 20 in which the filter is a band-pass filter.

23. The apparatus according to claim 20 further comprising two or more alternative spatial filters and a selector for selecting the output of one of the spatial filters depending on a comparison between respective filter outputs.

24. The apparatus according to claim 20 further comprising an inverse coring function.

25. The apparatus according to claim 20 in which the processor is configured to derive a block size parameter from analysis of the spatial frequency spectrum of the filtered data.

26. The apparatus according to claim 25 in which block size parameters from more than one image are combined.

27. The apparatus according to claim 20 in which the processor is configured to derive a block size parameter from analysis of a two dimensional autocorrelation function of the filtered data.

28. The apparatus according to claim 20 in which a block-artefact presence parameter is derived.

29. The apparatus according to claim 20 further comprising a summer to sum filtered and rectified data vertically over substantially a full image height.

30. The apparatus according to claim 20 further comprising a summer to sum filtered and rectified data horizontally over substantially a full image width.

31. The apparatus according to claim 20 in which the processor is configured to derive an impairment parameter from an autocorrelation function of summed data.

32. The apparatus according to claim 31 in which the processor is configured to derive at least one block size parameter from the distance between peaks in the autocorrelation function.

33. The apparatus according to claim 31 in which the processor is configured to derive a block size parameter from a discrete cosine transform of the autocorrelation function with one or more basis functions of the discrete cosine transform corresponding to expected block spatial frequencies.

34. The apparatus according to claim 31 comprising a spatial band-pass filter filtering the autocorrelation function.

35. The apparatus according claim 31 comprising a temporal low-pass filter operating on the autocorrelation function to combine data from two or more images in a sequence of images.

36. A method of analysing image data which has undergone prior processing on a block basis, wherein the prior processing includes evaluating energy within a band of spatial frequencies including spatial frequencies of expected block sizes; evaluating energy outside the band of spatial frequencies including the spatial frequencies of expected block sizes; and, flagging the presence of block artefacts when the energy within the band of spatial frequencies exceeds the energy outside the band of spatial frequencies by a threshold value, the method comprising:
deriving a set of values from the image data;
calculating an auto-correlation function on the set of values; and
deriving from the auto-correlation function an image parameter indicative of the prior processing.

* * * * *